United States Patent
Seki et al.

(10) Patent No.: US 11,962,061 B2
(45) Date of Patent: Apr. 16, 2024

(54) DIRECTIONAL COUPLER INCLUDING A MAIN LINE AND A SUB-LINE SWITCHABLY CONNECTED BETWEEN A COUPLING TERMINAL AND A TERMINAL CIRCUIT AT DIFFERENT TIMES

(71) Applicant: Murata Manufacturing Co., Ltd., Kyoto (JP)

(72) Inventors: Kenta Seki, Kyoto (JP); Ryangsu Kim, Kyoto (JP); Kazuhito Osawa, Kyoto (JP); Katsuya Shimizu, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 205 days.

(21) Appl. No.: 17/244,124

(22) Filed: Apr. 29, 2021

(65) Prior Publication Data

US 2021/0344096 A1    Nov. 4, 2021

(30) Foreign Application Priority Data

Apr. 30, 2020   (JP) ................. 2020-080302

(51) Int. Cl.
  *H01P 5/18*   (2006.01)
  *H01P 1/10*   (2006.01)
(52) U.S. Cl.
  CPC ............... *H01P 5/18* (2013.01); *H01P 1/10* (2013.01); *H01P 5/184* (2013.01)

(58) Field of Classification Search
  CPC ............. H01P 5/18; H01P 5/182; H01P 5/184
  USPC ......................................... 333/111
  See application file for complete search history.

(56) References Cited

U.S. PATENT DOCUMENTS

| | | | |
|---|---|---|---|
| 2016/0079650 A1* | 3/2016 | Solomko et al. | H03H 7/48 333/112 |
| 2017/0063425 A1* | 3/2017 | Khlat et al. | H04B 1/0475 |
| 2018/0062672 A1* | 3/2018 | Kim | H03F 3/24 |
| 2020/0021003 A1 | 1/2020 | Kim et al. | |

FOREIGN PATENT DOCUMENTS

| | | |
|---|---|---|
| CN | 107785641 A | 3/2018 |
| JP | 2018-037780 A | 3/2018 |
| WO | 2018174042 A1 | 9/2018 |

* cited by examiner

*Primary Examiner* — Benny T Lee
(74) *Attorney, Agent, or Firm* — Pearne & Gordon LLP

(57) ABSTRACT

A directional coupler includes a main line, a sub-line, a coupling terminal, a terminal circuit, a first switching circuit, and a second switching circuit. The first switching circuit and the second switching circuit respectively connects the first end and the second end of the sub-line alternately to the coupling terminal and to the terminal circuit. The first switching circuit connects the first end to the coupling terminal at a time that differs from a time at which the first switching circuit disconnects the first end from the terminal circuit. The first switching circuit disconnects the first end from the coupling terminal at a time that differs from a time at which the first switching circuit connects the first end to the terminal circuit.

10 Claims, 7 Drawing Sheets

DIRECTIONAL COUPLER INCLUDING A MAIN LINE AND A SUB-LINE SWITCHABLY CONNECTED BETWEEN A COUPLING TERMINAL AND A TERMINAL CIRCUIT AT DIFFERENT TIMES

CROSS REFERENCE TO RELATED APPLICATION

This application claims priority from Japanese Patent Application No. 2020-080302 filed on Apr. 30, 2020. The content of this application is incorporated herein by reference in its entirety.

BACKGROUND

The present disclosure relates to a directional coupler that retrieves a portion of a radio-frequency (RF) signal transmitted on a main line.

Japanese Unexamined Patent Application Publication No. 2018-37780 describes a directional coupler. The directional coupler described in Japanese Unexamined Patent Application Publication No. 2018-37780 includes a main line and a sub-line that are electromagnetically coupled to each other, a first switch, a second switch, a first terminal resistor, a second terminal resistor, and a detection port.

The first switch is connected to a first end of the sub-line, the detection port, and the first terminal resistor. The first terminal resistor is grounded. The second switch is connected to a second end of the sub-line, the detection port, and the second terminal resistor. The second terminal resistor is grounded.

For example, when a traveling wave traveling on the main line is to be detected, the first switch connects the first end of the sub-line to the detection port, and the second switch connects the second end of the sub-line to the ground with the second terminal resistor interposed therebetween. In contrast, when a reflected wave traveling on the main line is to be detected, the first switch connects the first end of the sub-line to the ground with the first terminal resistor interposed therebetween, and the second switch connects the second end of the sub-line to the detection port.

The directional coupler known in the related art, which is described in Japanese Unexamined Patent Application Publication No. 2018-37780, generally switches the first switch and the second switch simultaneously.

However, switching control of this type may increase the levels of unnecessary waves generated by switching, and it is possible that the inflow of the unnecessary waves into the main line deteriorates the characteristics of an RF circuit having the directional coupler.

BRIEF SUMMARY

The present disclosure provides a directional coupler that decreases the levels of unnecessary waves generated by switching.

A directional coupler according to embodiments of the present disclosure includes a main line, a sub-line electromagnetically coupled to the main line, a coupling terminal, a terminal circuit, a first switching circuit that connects a first end of the sub-line to the coupling terminal or the terminal circuit, and a second switching circuit that connects a second end of the sub-line to the coupling terminal or the terminal circuit.

The second switching circuit connects the second end to the terminal circuit when the first switching circuit connects the first end to the coupling terminal. The second switching circuit connects the second end to the coupling terminal when the first switching circuit connects the first end to the terminal circuit.

The first switching circuit connects the first end to the coupling terminal at a time that differs from a time at which the first switching circuit disconnects the first end from the terminal circuit. In addition, the first switching circuit disconnects the first end from the coupling terminal at a time that differs from a time at which the first switching circuit connects the first end to the terminal circuit.

This configuration enables the switching circuits to perform a plurality of switchings at different times. Accordingly, the levels of unnecessary waves generated by switching is reduced.

According to embodiments of the present disclosure, a directional coupler that decreases the levels of unnecessary waves generated by switching may be achieved.

Other features, elements, characteristics and advantages of the present disclosure will become more apparent from the following detailed description of embodiments of the present disclosure with reference to the attached drawings.

DETAILED DESCRIPTION

First Embodiment

Figure 1:
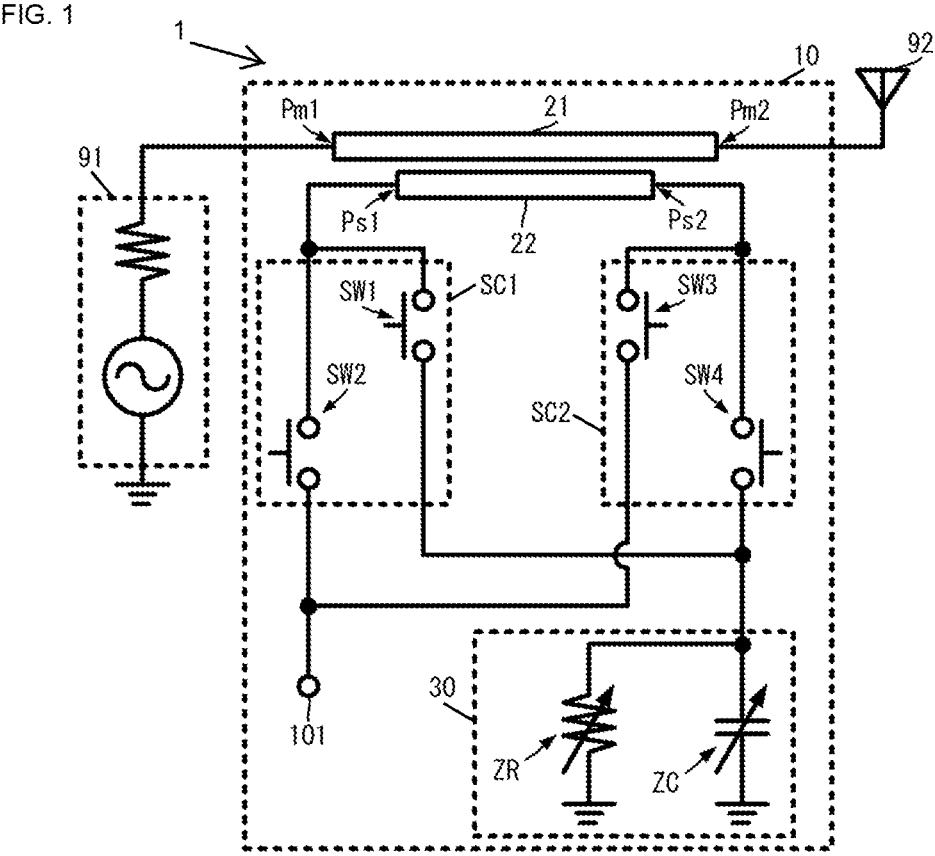
FIG. 1 is an equivalent circuit diagram of an RF circuit including a directional coupler according to a first embodiment.

A directional coupler according to a first embodiment of the present disclosure will be described with reference to the drawings. FIG. 1 is an equivalent circuit diagram of an RF circuit including the directional coupler according to the first embodiment.

As depicted in FIG. 1, an RF circuit 1 includes a directional coupler 10, a power source 91, and an antenna 92.

In a general operation of the RF circuit 1, the power source 91 generates an RF signal having a predetermined frequency (for example, a signal in a hundred MHz band or in a GHz band), and the antenna 92 transmits the RF signal outward. During the transmission, in addition to a traveling wave propagating from the power source 91 to the antenna 92, a reflected wave that is reflected at the antenna 92 and that travels from the antenna 92 toward the power source 91 is sometimes generated by a cause, such as an impedance mismatch with respect to the antenna 92. The directional coupler 10 is used to detect the levels of the traveling wave and the reflected wave.

The directional coupler 10 includes a main line 21 and a sub-line 22. The main line 21 forms a portion of a transmission line connecting the power source 91 and the antenna 92. One end Pm1 of the main line 21 is located on the power source 91 side, and the other end Pm2 is located on the antenna 92 side. The sub-line 22 is disposed so as to be electromagnetically coupled to the main line 21. For example, the sub-line 22 has a predetermined length and is disposed so as to run parallel to the main line 21. The sub-line 22 has a first end Ps1 and a second end Ps2.

The directional coupler 10 includes a first switching circuit SC1, a second switching circuit SC2, a terminal circuit 30, and a coupling terminal 101. The coupling terminal 101 provides an output terminal for a detected signal. The terminal circuit 30 includes a resistor set ZR and a capacitor set ZC as terminal elements. The resistor set ZR and the capacitor set ZC are connected to each other at one end and grounded at the other end. The resistor set ZR is a variable resistor, whose resistance value is adjustable, and the capacitor set ZC is a variable capacitor, whose capacitance value is adjustable.

The first switching circuit SC1 connects the first end Ps1 of the sub-line 22 to the terminal circuit 30 or to the coupling terminal 101. More specifically, the first switching circuit SC1 includes a switch SW1 and a switch SW2. The switches SW1 and SW2 are each a single pole single throw (SPST) switch. The first switching circuit SC1 may be formed by a single pole double throw (SPDT) switch.

The switch SW1 is connected between the first end Ps1 of the sub-line 22 and the terminal circuit 30. The switch SW2 is connected between the first end Ps1 of the sub-line 22 and the coupling terminal 101.

Basically, the first switching circuit SC1 opens the switch SW2 when closing the switch SW1. In contrast, the first switching circuit SC1 closes the switch SW2 when opening the switch SW1.

The second switching circuit SC2 connects the second end Ps2 of the sub-line 22 to the terminal circuit 30 or to the coupling terminal 101. More specifically, the second switching circuit SC2 includes a switch SW3 and a switch SW4. The switches SW3 and SW4 are each an SPST switch. The second switching circuit SC2 may be formed by an SPDT switch.

The switch SW3 is connected between the second end Ps2 of the sub-line 22 and the coupling terminal 101. The switch SW4 is connected between the second end Ps2 of the sub-line 22 and the terminal circuit 30.

Basically, the second switching circuit SC2 opens the switch SW4 when closing the switch SW3. In contrast, the second switching circuit SC2 closes the switch SW4 when opening the switch SW3.

Operation to Detect Traveling Wave and Reflected Wave

Figure 2A:
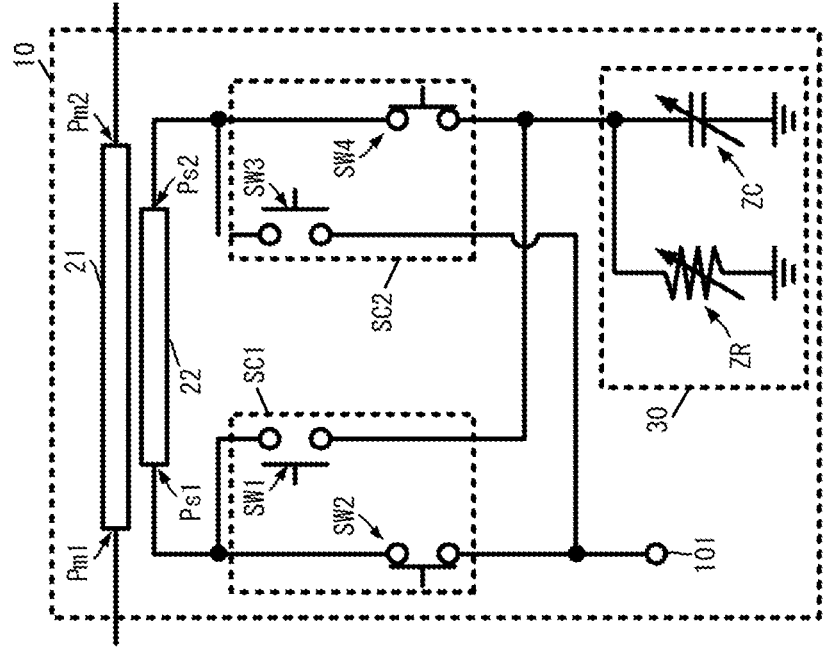
FIGS. 2A and 2B are each an equivalent circuit diagram depicting a connection state during a detection operation of the directional coupler.
Figure 2B:
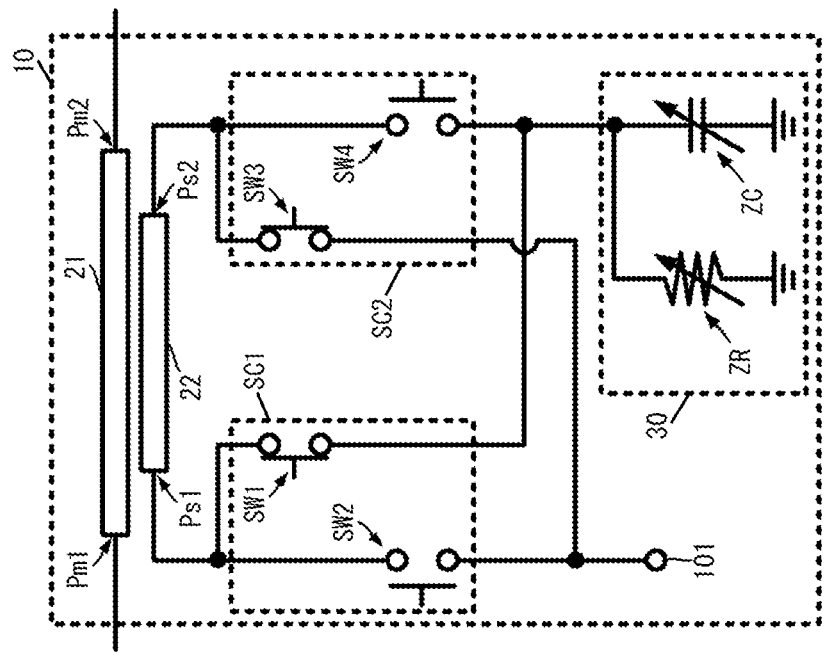

FIGS. 2A and 2B are each an equivalent circuit diagram depicting a connection state during a detection operation of the directional coupler 10. FIG. 2A depicts a connection state for outputting the detected signal of a reflected wave, and FIG. 2B depicts a connection state for outputting the detected signal of a traveling wave.

As depicted in FIG. 2A, when a reflected wave is detected, the first switching circuit SC1 connects the first end Ps1 of the sub-line 22 and the terminal circuit 30. The second switching circuit SC2 connects the second end Ps2 of the sub-line 22 and the coupling terminal 101.

More specifically, the first switching circuit SC1 closes the switch SW1 and opens the switch SW2. The second switching circuit SC2 closes the switch SW3 and opens the switch SW4.

This connection mode enables the detected signal of a reflected wave to be output from the coupling terminal 101.

As depicted in FIG. 2B, when a traveling wave is detected, the first switching circuit SC1 connects the first end Ps1 of the sub-line 22 and the coupling terminal 101. The second switching circuit SC2 connects the second end Ps2 of the sub-line 22 and the terminal circuit 30.

More specifically, the first switching circuit SC1 opens the switch SW1 and closes the switch SW2. The second switching circuit SC2 opens the switch SW3 and closes the switch SW4.

This connection mode enables the detected signal of a traveling wave to be output from the coupling terminal 101.

Figure 3:
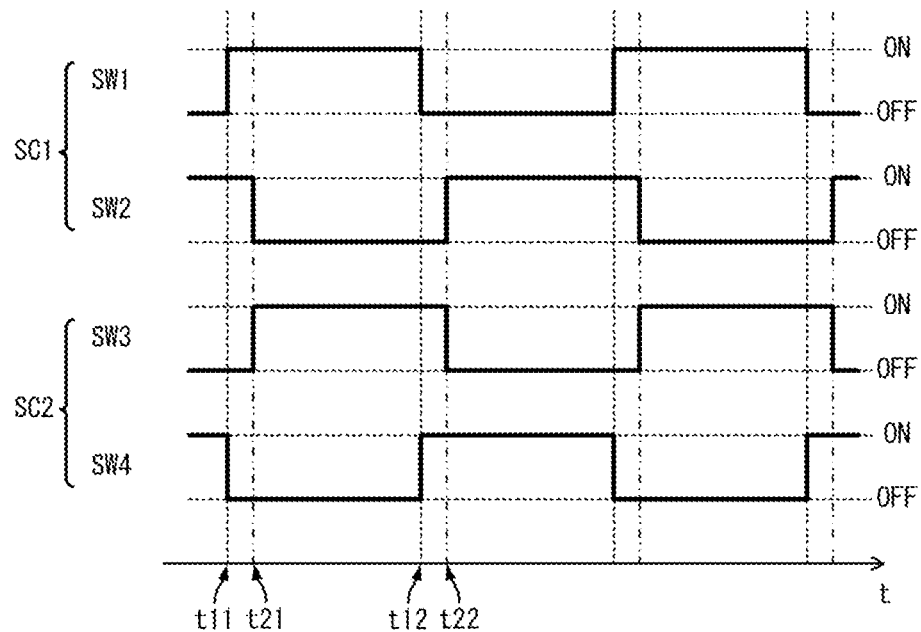
FIG. 3 depicts a timing chart of switching control of each switch.

In such a configuration, the first switching circuit SC1 and the second switching circuit SC2 perform switching control of each switch as follows. FIG. 3 depicts a timing chart for switching control of each switch.

As depicted in FIG. 3, the first switching circuit SC1 changes the state of the switch SW1 from off to on, namely from open to closed, at time t11. In synchronization with this operation, the second switching circuit SC2 changes the state of the switch SW4 from on to off, namely from closed to open.

Then, the first switching circuit SC1 changes the state of the switch SW2 from on to off, namely from closed to open, at time t21. In synchronization with this operation, the second switching circuit SC2 changes the state of the switch SW3 from off to on, namely from open to closed.

These operations switch the directional coupler 10 from a state for outputting the detected signal of a traveling wave to a state for outputting the detected signal of a reflected wave.

Next, the first switching circuit SC1 changes the state of the switch SW1 from on to off, namely from closed to open, at time t12. In synchronization with this operation, the second switching circuit SC2 changes the state of the switch SW4 from off to on, namely from open to closed.

Then, the first switching circuit SC1 changes the state of the switch SW2 from off to on, namely from open to closed, at time t22. In synchronization with this operation, the second switching circuit SC2 changes the state of the switch SW3 from on to off, namely from closed to open.

These operations switch the directional coupler 10 from a state for outputting the detected signal of a reflected wave to a state for outputting the detected signal of a traveling wave.

Thereafter, as depicted in FIG. 3, the directional coupler 10 switches between a state for outputting the detected signal of a traveling wave and a state for outputting the detected signal of a reflected wave.

As depicted in FIG. 3, the first switching circuit SC1 switches the switch SW1 at a time that differs from a time at which the first switching circuit SC1 switches the switch SW2. Similarly, the second switching circuit SC2 switches the switch SW3 at a time that differs from a time at which the second switching circuit SC2 switches the switch SW4. The word "switch" as used here indicates that each switch changes the state and does not indicates that one switch is replaced by another switch. Specifically, the word "switch" indicates that the state of a switch is changed from on to off (from closed to open) or from off to on (from open to closed). Hereinafter, the word "switch" as used in the present disclosure indicates a change in the state of a switch.

These operations can reduce superposition of unnecessary waves generated by switching a plurality of switches and reduce the levels of unnecessary waves.

Figure 4:
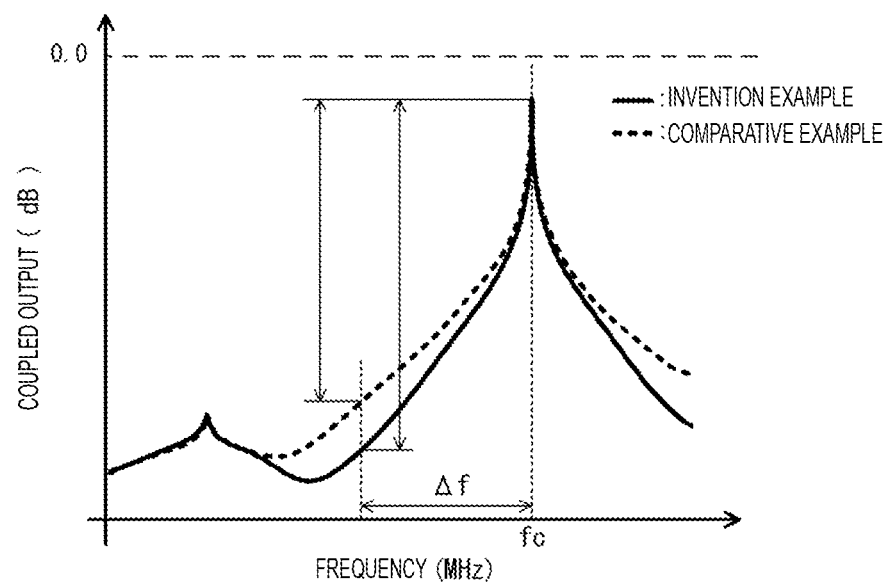
FIG. 4 is a graph depicting frequency characteristics of a coupled output.

FIG. 4 is a graph depicting frequency characteristics of a coupled output. In FIG. 4, the solid line indicates a result for an example in the embodiment according to the present disclosure, and the dashed line indicates a result for a comparative example. In the comparative example, the plurality of switches are simultaneously switched, as is generally performed in the related art.

As depicted in FIG. 4, a configuration and an operation according to the embodiment of the present disclosure can reduce the levels of unnecessary waves at a frequency separated from a coupling frequency fc by a specific frequency $\Delta f$. Further, the configuration and the operation according to the embodiment of the present disclosure avoids reduction in the coupled output at the coupling frequency fc.

Accordingly, the use of the configuration and the operation according to the embodiment of the present disclosure enables the directional coupler 10 to reduce the levels of unnecessary waves while maintaining the degree of coupling necessary for the traveling wave and the reflected wave.

The timing chart depicted in FIG. 3 presents an example in which the switches SW1 and SW4, which are connected to the terminal circuit 30, are switched earlier than the switches SW2 and SW3, which are connected to the coupling terminal 101, in the first and second switching circuits SC1 and SC2. However, the switches SW1 and SW4 and the switches SW2 and SW3 may be switched in the reverse order. In other words, the switches SW2 and SW3, which are connected to the coupling terminal 101, may be switched earlier than the switches SW1 and SW4, which are connected to the terminal circuit 30. The levels of unnecessary waves can be reduced also in this case.

More Specific Configuration Example of Switching Circuit

Figure 5:
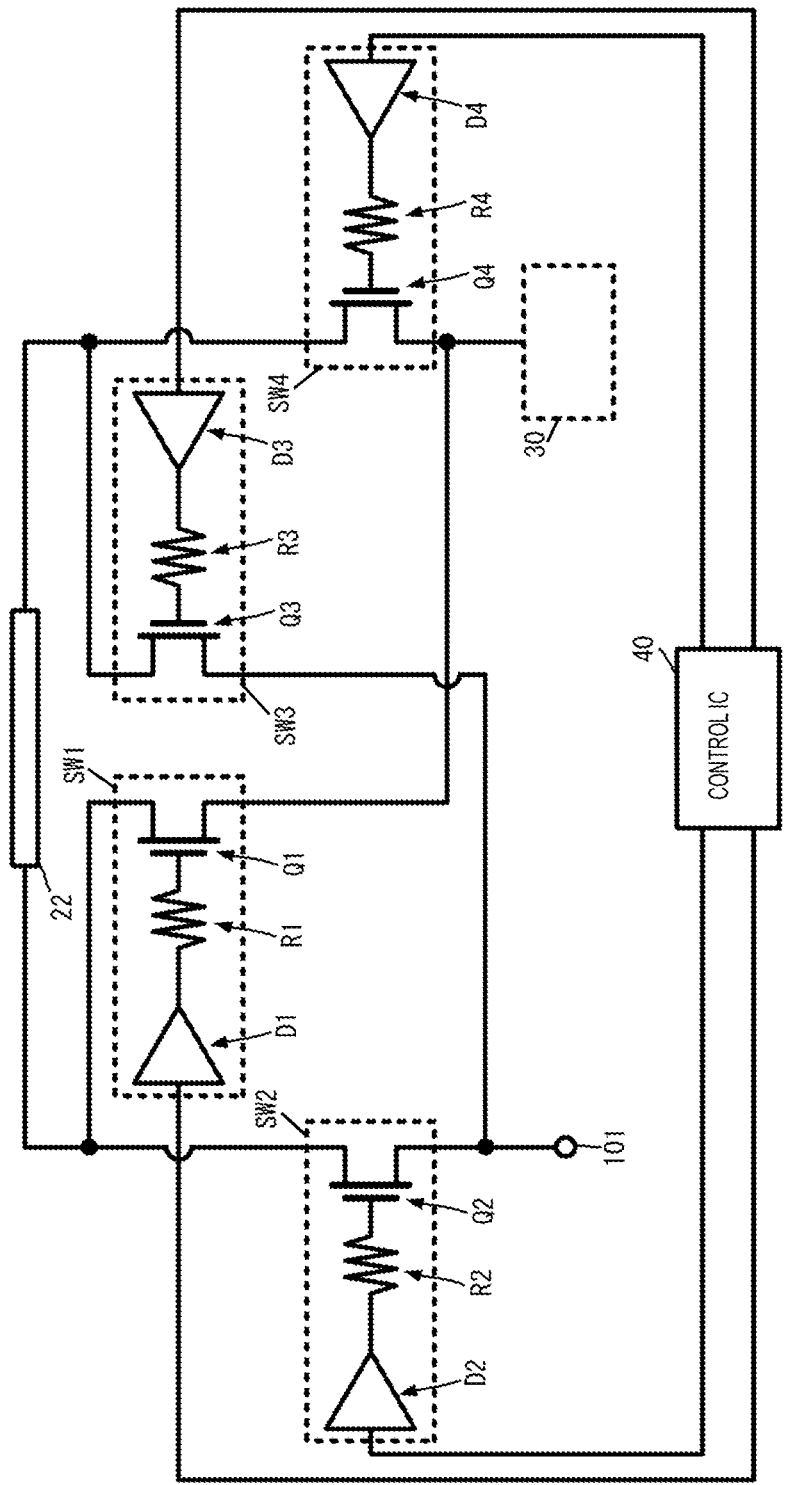
FIG. 5 is an equivalent circuit diagram depicting an example of a more specific configuration of switches forming a plurality of switching circuits.

FIG. 5 is an equivalent circuit diagram depicting an example of a more specific configuration of switches forming a plurality of switching circuits. As depicted in FIG. 5, the switch SW1 includes a switching element Q1, a resistor R1, and a driving element D1. The switching element Q1 is, for example, a field effect transistor (FET). The resistor R1 is connected to the control terminal of the switching element Q1. For example, if the switching element Q1 is an FET, the resistor R1 is connected to the gate. The driving element D1 is connected to the resistor R1. The switching element Q1 switches between on and off (closed and open), as described above, in accordance with a drive signal from the driving element D1.

The switch SW2 includes a switching element Q2, a resistor R2, and a driving element D2. The resistor R2 is connected to the control terminal of the switching element Q2, and the driving element D2 is connected to the resistor R2. The switching element Q2 switches between on and off (closed and open), as described above, in accordance with a drive signal from the driving element D2.

The switch SW3 includes a switching element Q3, a resistor R3, and a driving element D3. The resistor R3 is connected to the control terminal of the switching element Q3, and the driving element D3 is connected to the resistor R3. The switching element Q3 switches between on and off (closed and open), as described above, in accordance with a drive signal from the driving element D3.

The switch SW4 includes a switching element Q4, a resistor R4, and a driving element D4. The resistor R4 is connected to the control terminal of the switching element Q4, and the driving element D4 is connected to the resistor R4. The switching element Q4 switches between on and off (closed and open), as described above, in accordance with a drive signal from the driving element D4.

The driving elements D1, D2, D3, and D4 are connected to, for example, a control integrated circuit (IC) 40. The control IC 40 generates a control signal to synchronize the driving elements D1, D2, D3, and D4 and control the switching described above.

In such a configuration, the resistance values of the resistor R1 of the switch SW1 and the resistor R2 of the switch SW2 differ from each other. The different resistance values lead to different switching time constants for the switching elements Q1 and Q2. A switching time constant determines a time period that elapses since a drive signal is output from each driving element until the state of the corresponding switching element changes.

Thus, if the driving elements D1 and D2 supply drive signals synchronously, the time at which the switching element Q1 is switched and the time at which the switching element Q2 is switched do not coincide with each other. In other words, the switch SW1 can be switched at a time that differs from a time at which the switch SW2 is switched.

In addition, the resistance values of the resistor R3 of the switch SW3 and the resistor R4 of the switch SW4 differ from each other. The different resistance values lead to different switching time constants for the switching elements Q3 and Q4.

Thus, if the driving elements D3 and D4 supply drive signals synchronously, the time at which the switching element Q3 is switched and the time at which the switching element Q4 is switched do not coincide with each other. In other words, the switch SW3 can be switched at a time that differs from a time at which the switch SW4 is switched.

In addition, the resistance values of the resistor R1 of the switch SW1 and the resistor R4 of the switch SW4 are set substantially equal to each other. This setting enables the switches SW1 and SW4 to be switched substantially at the same time.

Similarly, the resistance values of the resistor R2 of the switch SW2 and the resistor R3 of the switch SW3 are set substantially equal to each other. This setting enables the switches SW2 and SW3 to be switched substantially at the same time.

The switch SW1 may also be switched at a time that differs from a time at which the switch SW2 is switched by making the capacitance value of the switching element Q1 differ from the capacitance value of the switching element Q2. Different capacitance values may be obtained, for example, by making gate widths of the switching elements Q1 and Q2 differ from each other. Different capacitance values may also be obtained by making gate lengths of the switching elements Q1 and Q2 differ from each other.

Figure 6:
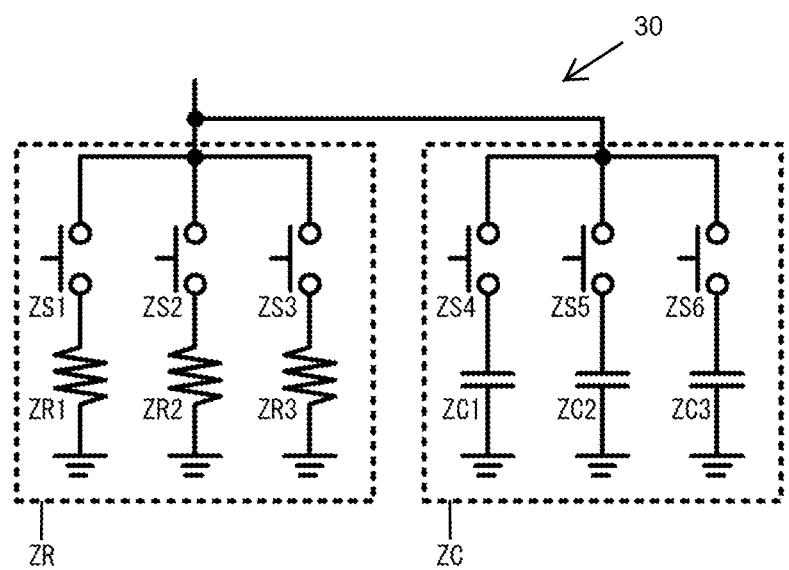
FIG. 6 is an equivalent circuit diagram depicting an example of a specific configuration of a terminal circuit.

Similarly, the switch SW3 may also be switched at a time that differs from a time at which the switch SW4 is switched by making the capacitance value of the switching element Q3 differ from the capacitance value of the switching element Q4. Different capacitance values may be obtained, for example, by making gate widths of the switching elements Q3 and Q4 differ from each other or by making gate lengths of the switching elements Q3 and Q4 differ from each other. Specific Configuration Example of Terminal Circuit FIG. 6 is an equivalent circuit diagram depicting an example of a specific configuration of a terminal circuit. As depicted in FIG. 6, the terminal circuit 30 includes the resistor set ZR and the capacitor set ZC.

The resistor set ZR includes resistors ZR1, ZR2, and ZR3 and terminal switches ZS1, ZS2, and ZS3. The resistance values of the resistors ZR1, ZR2, and ZR3 are fixed.

The resistor ZR1 and the terminal switch ZS1 are connected in series, the resistor ZR2 and the terminal switch ZS2 are connected in series, and the resistor ZR3 and the terminal switch ZS3 are connected in series. The resistors ZR1, ZR2, and ZR3 are grounded. The terminal at the opposite end of the terminal switch ZS1 from the resistor ZR1, the terminal at the opposite end of the terminal switch ZS2 from the resistor ZR2, and the terminal at the opposite end of the terminal switch ZS3 from the resistor ZR3 are connected to each other. Control of switching between on and off, namely closed and open, of the terminal switches ZS1, ZS2, and ZS3 varies the resistance value of the resistor set ZR. The resistance value of the resistor set ZR is set in accordance with the frequency of an RF signal to be detected.

The capacitor set ZC includes capacitors ZC1, ZC2, and ZC3 and terminal switches ZS4, ZS5, and ZS6. The capacitance values of the capacitors ZC1, ZC2, and ZC3 are fixed.

The capacitor ZC1 and the terminal switch ZS4 are connected in series, the capacitor ZC2 and the terminal switch ZS5 are connected in series, and the capacitor ZC3 and the terminal switch ZS6 are connected in series. The capacitors ZC1, ZC2, and ZC3 are grounded. The terminal at the opposite end of the terminal switch ZS4 from the capacitor ZC1, the terminal at the opposite end of the terminal switch ZS5 from the capacitor ZC2, and the terminal at the opposite end of the terminal switch ZS6 from the capacitor ZC3 are connected to each other. Control of switching between on and off, namely closed and open, of the terminal switches ZS4, ZS5, and ZS6 varies the capacitance value of the capacitor set ZC. The capacitance value of the capacitor set ZC is set in accordance with the frequency of an RF signal to be detected.

The connecting node of the resistors ZR1, ZR2, and ZR3 is connected to the connecting node of the capacitors ZC1, ZC2, and ZC3.

In such a configuration, each of the plurality of terminal switches ZS1 to ZS6 is switched at a time that coincides neither with a time at which the switch SW1 is switched nor with a time at which the switch SW2 is switched in the first switching circuit SC1 and neither with a time at which the switch SW3 is switched nor with a time at which the switch SW4 is switched in the second switching circuit SC2.

In this way, the directional coupler 10, which is configured to include the terminal circuit 30, which is variable, may reduce or prevent the temporal overlap between switchings of a plurality of switches. Thus, for example, the directional coupler 10 may reduce the levels of unnecessary waves when detecting any RF signal selected by switching for detection from RF signals of multiple kinds.

Second Embodiment

Figure 7:
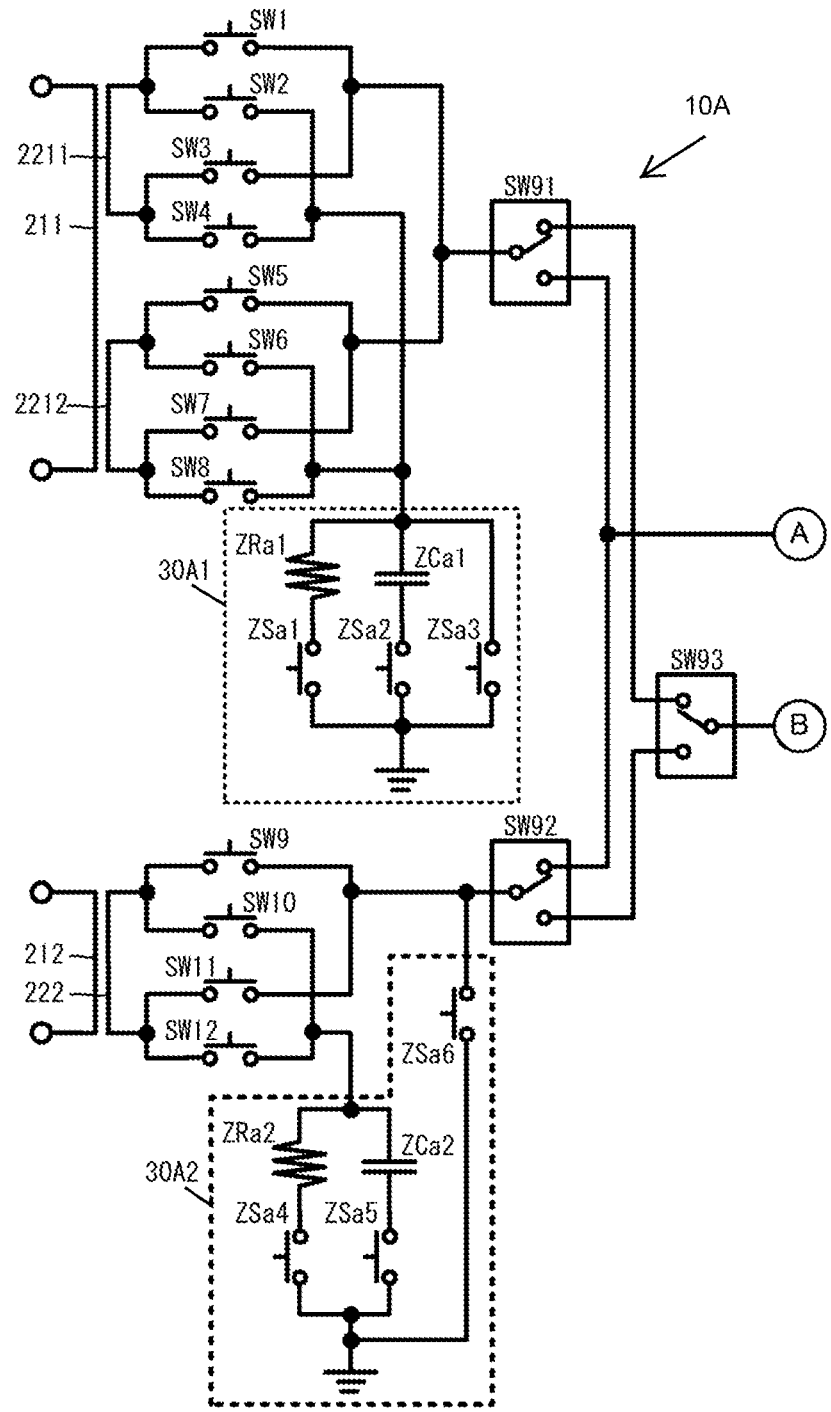
FIG. 7 is an equivalent circuit diagram of an RF circuit including a directional coupler according to a second embodiment.
Figure 8:
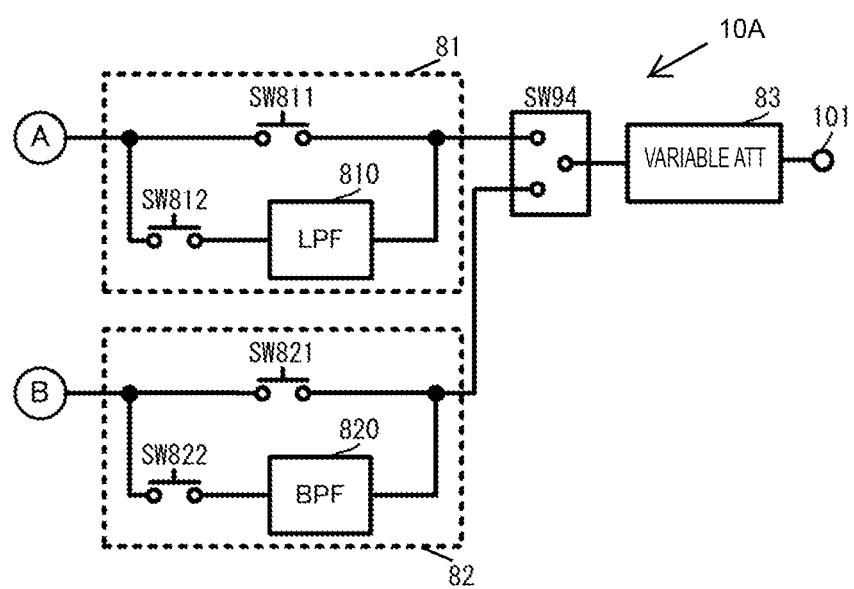
FIG. 8 is an equivalent circuit diagram of the RF circuit including the directional coupler according to the second embodiment.

A directional coupler according to a second embodiment of the present disclosure will be described with reference to the drawings. FIGS. 7 and 8 depict an equivalent circuit diagram of an RF circuit including the directional coupler according to the second embodiment. The point A in FIG. 7 continues to the point A in FIG. 8, and the point B in FIG. 7 continues to the point B in FIG. 8.

As depicted in FIGS. 7 and 8, a directional coupler 10A according to the second embodiment differs from the directional coupler 10 according to the first embodiment in the numbers of main lines and sub-lines, the numbers of switching circuits and terminal circuits, and a configuration of a circuit located between a plurality of switching circuits and a coupling terminal 101. Operations of the switching circuits of the directional coupler 10A are similar to the operations of the switching circuits of the directional coupler 10 described above, and operations of the terminal circuits of the directional coupler 10A are similar to the operation of the terminal circuit 30 described above. Thus, similar points and analogous points that can easily be inferred from the description will not be repeated in the following description.

Configuration of Directional Coupler 10A

The directional coupler 10A includes main lines 211 and 212, sub-lines 2211, 2212 and 222. The sub-lines 2211 and 2212 are electromagnetically coupled to the main line 211. The sub-line 222 is electromagnetically coupled to the main line 212.

The directional coupler 10A includes a plurality of switches SW1 to SW12. The set of the switches SW1 and SW2, the set of the switches SW5 and SW6, and the set of the switches SW9 and SW10 each correspond to a "first switching circuit" according to the present disclosure. The set of the switches SW3 and SW4, the set of the switches SW7 and SW8, and the set of the switches SW11 and SW12 each correspond to a "second switching circuit" according to the present disclosure.

The directional coupler 10A includes terminal circuits 30A1 and 30A2 and the coupling terminal 101.

The directional coupler 10A includes a plurality of switches SW91 to SW94. The directional coupler 10A includes a plurality of switches SW811, SW812, SW821, and SW822, a low pass filter (LPF) 810, a band pass filter (BPF) 820, and a variable attenuator (ATT) 83. The plurality of switches SW811 and SW812 and the LPF 810 form a low band filter circuit 81. The plurality of switches SW821 and SW822 and the BPF 820 form a high band filter circuit 82.

A circuit formed by the plurality of switches SW91 to SW94, the plurality of switches SW811, SW812, SW821, and SW822, the LPF 810, the BPF 820, and the variable ATT 83 corresponds to a "detection channel switching circuit" according to the present disclosure.

The switches SW1 and SW2 are connected to the first end of the sub-line 2211. The switches SW3 and SW4 are connected to the second end of the sub-line 2211. The switches SW1 and SW3 are connected to the switch SW91. The switches SW2 and SW4 are connected to the terminal circuit 30A1.

The switches SW5 and SW6 are connected to the first end of the sub-line 2212. The switches SW7 and SW8 are connected to the second end of the sub-line 2212. The switches SW5 and SW7 are connected to the switch SW91. The switches SW6 and SW8 are connected to the terminal circuit 30A1.

The switches SW9 and SW10 are connected to the first end of the sub-line 222. The switches SW11 and SW12 are connected to the second end of the sub-line 222. The switches SW9 and SW11 are connected to the switch SW92. The switches SW10 and SW12 are connected to the terminal circuit 30A2.

The terminal circuit 30A1 includes a resistor ZRa1, a capacitor ZCa1, and a plurality of terminal switches ZSa1 to ZSa3. The resistor ZRa1 is a variable resistor, and the capacitor ZCa1 is a variable capacitor. The resistor ZRa1 and the terminal switch ZSa1 are connected in series, and the capacitor ZCa1 and the terminal switch ZSa2 are connected in series. These series circuits and the terminal switch ZSa3 are connected in parallel. One end of this parallel circuit (one end of the terminal circuit 30A1) is connected to the switching circuits described above, and the other end is grounded.

The terminal circuit 30A2 includes a resistor ZRa2, a capacitor ZCa2, and a plurality of terminal switches ZSa4 to ZSa6. The resistor ZRa2 is a variable resistor, and the capacitor ZCa2 is a variable capacitor. The resistor ZRa2 and the terminal switch ZSa4 are connected in series, and the capacitor ZCa2 and the terminal switch ZSa5 are connected in series. These series circuits are connected in parallel. One end of this parallel circuit is connected to the switching circuits described above, and the other end is grounded. One end of the terminal switch ZSa6 is connected to the switches SW9, SW11, and SW92, and the other end is grounded.

The plurality of switches SW91 to SW94 are each a so-called SPDT switch. The switch SW91 is connected to the switch SW93 and the low band filter circuit 81 (refer to FIG. 8). The switch SW91 connects one of the switches SW1, SW3, SW5, and SW7 to the switch SW93 or the low band filter circuit 81.

The switch SW92 is connected to the switch SW93 and the high band filter circuit 82 (refer to FIG. 8). The switch SW92 connects one of the switches SW9 and SW11 to the switch SW93 or the low band filter circuit 81.

The switch SW93 connects the high band filter circuit 82 to the switch SW91 or the switch SW92.

The low band filter circuit 81 includes the switch SW812 and the LPF 810 connected in series in this order. The switch SW811 is connected parallel to this series circuit. The connecting node between the switches SW811 and SW812 is connected to the switches SW91 and SW92. The connecting node between the switch SW811 and the LPF 810 is connected to the switch SW94. The low band filter circuit 81 may include other switches, which are not depicted.

The high band filter circuit 82 includes the switch SW822 and the BPF 820 connected in series in this order. The switch SW821 is connected parallel to this series circuit. The connecting node between the switches SW821 and SW822 is connected to the switch SW93. The connecting node between the switch SW821 and the BPF 820 is connected to the switch SW94. The high band filter circuit 82 may include other switches, which are not depicted.

The switch SW94 connects the coupling terminal 101 to the low band filter circuit 81 or the high band filter circuit 82.

In such a configuration, the plurality of switches forming the switching circuits are switched at least at times that differ from each other. In addition, each of the switches forming the switching circuits is switched at a time that does not coincide with a time at which any of the terminal switches forming the terminal circuits is switched. Further, each of the switches in the detection channel switching circuit is switched at a time that does not coincide at least with a time at which any of the switches forming the switching circuits is switched. Each of the switches in the detection channel switching circuit can be switched at a time that does not coincide further with a time at which any of the terminal switches forming the terminal circuits is switched.

In this way, the levels of unnecessary waves generated by switchings of the switches may be reduced. More specifically, the levels of unnecessary waves may be reduced if a plurality of sub-lines are switched in a mode of switching to detect RF signals of multiple kinds.

In the second embodiment described above, the numbers of main lines and sub-lines, the numbers of switching circuits and terminal circuits, and the number of filter circuits are presented by way of example, and the advantageous effects described above may be obtained if the switches are switched as described above in other configurations.

The configuration in each embodiment described above may be combined as appropriate and an advantageous effect may be obtained in accordance with each combination.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A directional coupler comprising:
a main line;
a sub-line electromagnetically coupled to the main line;
a coupling terminal;
a terminal circuit;
a control circuit configured to generate a control signal;
a first switching circuit configured to selectively connect a first end of the sub-line to the coupling terminal or the terminal circuit; and
a second switching circuit configured to selectively connect a second end of the sub-line to the coupling terminal or the terminal circuit,
wherein the second switching circuit is configured to connect the second end of the sub-line to the terminal circuit when the first switching circuit connects the first end of the sub-line to the coupling terminal,
wherein the second switching circuit is configured to connect the second end of the sub-line to the coupling terminal when the first switching circuit connects the first end of the sub-line to the terminal circuit, and
wherein the first switching circuit is configured to:
connect the first end of the sub-line to the coupling terminal at a different time than when the first switching circuit disconnects the first end of the sub-line from the terminal circuit based on the control signal, and
disconnect the first end of the sub-line from the coupling terminal at a different time than when the first switching circuit connects the first end of the sub-line to the terminal circuit based on the control signal.

2. The directional coupler according to claim 1, wherein a switching time constant for the first switching circuit to connect the first end of the sub-line to the coupling terminal is different than a switching time constant for the first switching circuit to disconnect the first end of the sub-line from the terminal circuit.

3. The directional coupler according to claim 2,
wherein the first switching circuit comprises:
a first switching circuit element configured to connect or disconnect the first end of the sub-line to or from the terminal circuit, and
a second switching circuit element configured to connect or disconnect the first end of the sub-line to or from the coupling terminal, and
wherein a capacitance value of the first switching circuit element is different than a capacitance value of the second switching circuit element.

4. The directional coupler according to claim 2,
wherein the first switching circuit comprises:
a first switching circuit element configured to connect or disconnect the first end of the sub-line to or from the terminal circuit, a first resistor connected to a control terminal of the first switching circuit element, a second switching circuit element configured to connect or disconnect the first end of the sub-line to or from the coupling terminal, and a second resistor connected to a control terminal of the second switching circuit element, and wherein a resistance value of the first resistor is different than a resistance value of the second resistor.

5. The directional coupler according to claim 1, wherein a switching time constant for the first switching circuit to disconnect the first end of the sub-line from the coupling terminal is different than a switching time constant for the first switching circuit to connect the first end of the sub-line to the terminal circuit.

6. The directional coupler according to claim 5, wherein the first switching circuit comprises:

a first switching circuit element configured to connect or disconnect the first end of the sub-line to or from the terminal circuit, a first resistor connected to a control terminal of the first switching circuit element, a second switching circuit element configured to connect or disconnect the first end of the sub-line to or from the coupling terminal, and a second resistor connected to a control terminal of the second switching circuit element, and wherein a resistance value of the first resistor is different than a resistance value of the second resistor.

7. The directional coupler according to claim 5, wherein the first switching circuit comprises:

a first switching circuit element configured to connect or disconnect the first end of the sub-line to or from the terminal circuit, and a second switching circuit element configured to connect or disconnect the first end of the sub-line to or from the coupling terminal, and wherein a capacitance value of the first switching circuit element is different than a capacitance value of the second switching circuit element.

8. The directional coupler according to claim 1, wherein the terminal circuit comprises:

a plurality of terminal circuit elements, and a terminal circuit switch configured to selectively connect the plurality of terminal elements to the sub-line, and wherein the terminal circuit switch is configured to be switched at a different time than when the first switching circuit is switched.

9. The directional coupler according to claim 1, wherein the second switching circuit is configured to:

connect the second end of the sub-line to the coupling terminal at a different time than when the second switching circuit disconnects the second end of the sub-line from the terminal circuit based on the control signal, and disconnect the second end of the sub-line from the coupling terminal at a different time than when the second switching circuit connects the second end of the sub-line to the terminal circuit based on the control signal, wherein the first switching circuit is configured to connect the first end of the sub-line to the coupling terminal at the same time as the second switching circuit connects the second end of the sub-line to the terminal circuit, and the first switching circuit is configured to connect the first end of the sub-line to the terminal circuit at the same time as the second switching circuit connects the second end of the sub-line to the coupling terminal.

10. The directional coupler according to claim 1, further comprising:

a detection channel switching circuit configured to selectively connect the first and second switching circuits to the coupling terminal, wherein the detection channel switching circuit comprises a switch configured to change a detection channel, and the switch is configured to be switched at a different time than when the first switching circuit is switched, and at a different time than when the second switching circuit is switched.

* * * * *